UNITED STATES PATENT OFFICE.

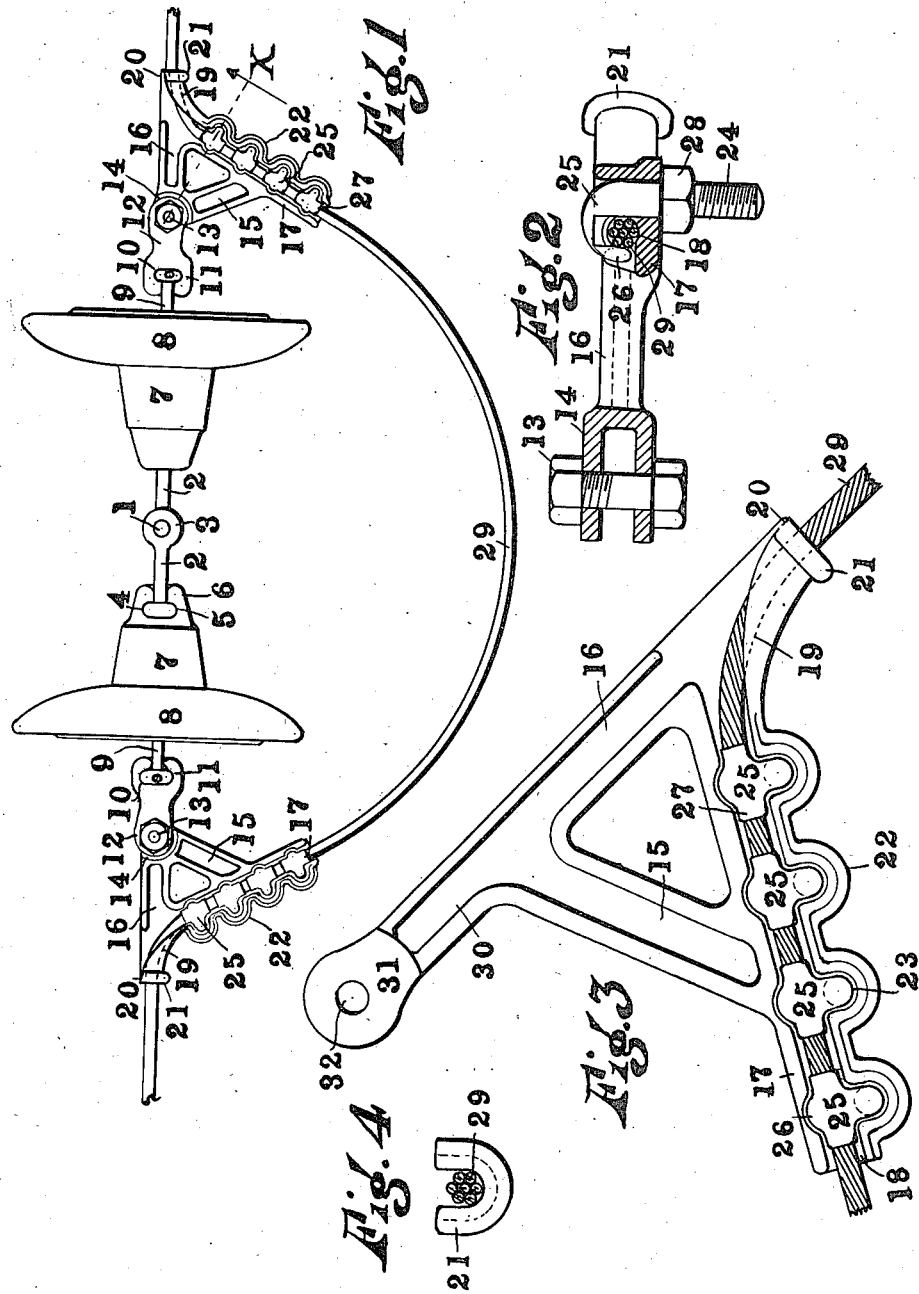

ARTHUR O. AUSTIN, OF BARBERTON, OHIO, ASSIGNOR, BY MESNE ASSIGNMENTS, TO THE OHIO INSULATOR COMPANY, OF MANSFIELD, OHIO, A CORPORATION OF OHIO.

STRAIN-CLAMP.

1,002,113.     Specification of Letters Patent.     Patented Aug. 29, 1911.

Application filed December 15, 1909. Serial No. 533,193.

*To all whom it may concern:*

Be it known that I, ARTHUR O. AUSTIN, a citizen of the United States, residing at Barberton, in the county of Summit and State of Ohio, have invented new and useful Improvements in Strain-Clamps, of which the following is a specification.

This invention relates to improvements in clamps for supporting electric current-conducting cables or wires and the object thereof is to provide a clamp primarily adapted to be used as a strain clamp to support an electric current-conducting cable or wire.

It is contemplated that this clamp will be connected with an insulator unit or a plurality of units to insulate the former from the supporting medium therefor and it is especially designed to hold a cable in such a position as to permit a portion thereof to swing away from or be thrown clear of the supporting medium for the insulator units by which the clamp is sustained to constitute a jumper.

The invention further contemplates so constructing the device that it may be attached to a cable while under tension and may be used to support an intermediate portion of a cable or an end thereof, said clamp provided with a curvilinearly-formed seat, adapted when the cable is under tension, to swing upwardly against the cable or conductor for supporting the same in a position to prevent kinking or unnecessary bending thereof which would injure the cable or conductor, said seat for the cable being arranged to hold the latter in the line of strain.

A further object of the invention is to so construct the device that it may be pivotally-connected to the insulator unit by which the same is supported, so that the portion thereof in which the cable or conductor seats may be effectively utilized while in a horizontal position and therefore adapted for use as a suspension clamp; but if used as a strain clamp the portion containing the seat will be swung upwardly at such an angle to the line of strain of the cable or conductor that the curvilinear seat which is formed at at least one end of the clamp will be raised sufficiently to suitably support the cable or conductor and causing the latter to conform to the curvilinearly-formed seat which is formed on an arc of considerable radius so as to in no way impair or injure the cable itself, yet permitting the lower end thereof to depend from the opposite side of the clamp.

A still further object of the invention is to provide a device of the character named which will work perfectly, either when suspended in such a position that the wire-engaging portion of the clamp is horizontal, or when swung upwardly and used as a strain clamp.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings, in which similar reference numerals indicate like parts in the different figures: Figure is a view in side elevation of a pair of clamps constructed in accordance with this invention suitably supported from a supporting means therefor by properly-positioned insulator units and holding an electric current-conducting wire or cable to form a jumper around the clamp support. Fig. 2 is a view of Fig. 1 in section on line X thereof. Fig. 3 is an enlarged view of a strain clamp embodying this invention of a slightly modified construction from that shown in Fig. 1; and, Fig. 4 is a view in end elevation of the seat in the clamp which supports a cable or conductor when used as a strain clamp.

In the drawings, the device is shown in use as a strain clamp for holding the intermediate portion of an electric cable or conductor to form a jumper around the support by which the clamps are sustained.

Referring to the drawings in detail, 1 denotes a pin or arm suitably-mounted on a post, tower, or other fixed structure used for supporting electric wires or cables. Mounted on the pin 1 are a pair of pins 2, 2, each provided with an eye 3 to receive the pin 1. The opposite end of each of these pins is provided with an enlarged head 4 adapted to be positioned in an inverted T-shaped recess 5 formed in the head 6 of a cap 7 connected with an insulator unit 8. Extending from each of the insulator units 8 is a pin 9 provided with an enlarged head 10 similar to the heads 4 adapted to seat in an inverted T-shaped recess 11 in the end of a coupling member 12, the opposite end of which is provided with an aperture to receive a bolt 13.

It will be obvious that the insulator units may be provided with any other means for connecting them with the support 1 and the connection between these units and the ends of the coupling members may be differently formed and constructed so long as these connections pivotally-unite the insulators with the support 1 and the coupling members pivotally with the insulator units.

The clamps each preferably embody a bifurcated head 14, preferably adapted to receive between them the free end of one of the coupling members 12 and be pivotally-united therewith through the medium of a bolt 13. Preferably formed integral with the bifurcated head 14 and extending therefrom at divergent angles are two arms 15 and 16 having their outer ends united by an integral body portion 17 provided with a groove 18 in one side face thereof adapted to receive the electric cable or conductor. At least one end of the body portion 17, preferably near its junction with the arm 16, is provided with a curvilinear groove 19 constituting a continuation of the groove 18 and formed by having one of the sides 20 of the body upturned to form an approximately semi-circular seat, the outer end of which is surrounded by a beading 21. The outer lateral face 22 of the body portion 17 is sinuously-formed to provide in each of the sinuosities thereof a recess 23 adjacent the groove 18. Each of these recesses is provided with an aperture extending through the body portion of the clamp adjacent the groove 18 to receive the shank 24 of a clamping bolt 25, the upper end 26 of which is hook-shaped and provided with laterally-extending portions 27 to grip the cable or conductor mounted in the groove 18. Mounted on the shanks 24 of the bolts 25 are nuts 28 adapted to be drawn up against the opposite face of the body portion 17 for causing a firm gripping engagement between the hook-shaped heads 26 and the cable 29 which is mounted therein.

When the device is being installed for use as a suspension clamp all the nuts 28 are released sufficiently to permit the cable to be passed under the hook-shaped heads thereof and be seated in the groove 18, during which time the body portion 17 may be in a horizontal position, after which the bolts 25 are clamped upon the cable 29 securely holding it in position with a portion thereof projecting outwardly in alinement with the groove 18.

After connecting the clamp with the cable any strain placed thereon will cause the clamp to be swung up to the position shown in Fig. 1 to cause the floor of the groove or seat 19 to sustain the cable or conductor against any unnecessary bending, kinking, or other impairment and permitting the opposite end to swing downwardly to form a jumper, as shown in this figure.

It will be obvious that this clamp may be employed at one of the ends of the cable or conductor and will efficiently hold the same with the seat 19 of the clamp arranged in the line of strain of the cable or conductor; but if the clamp is interposed intermediate a line and serves as an ordinary suspension clamp, the portion of the cable which would otherwise be supported by the seat 19 would extend outwardly in alinement with the groove 18.

It will be apparent that instead of employing the bifurcated head 14 to receive the end of the coupling member 12 any other preferred construction may be employed for pivotally-mounting the clamp on an insulator.

In the illustration shown in Fig. 3 the body portion of the clamp is constructed exactly the same as has been described with reference to the clamp shown in Fig. 1, but in the device shown in Fig. 3 the clamp is provided with an extended arm 30, preferably provided with a bifurcated head 31 having an aperture 32 for connecting it with a suitable connecting member, or with the pin of an insulator unit, as desired; the balance of the device shown in Fig. 3 is constructed similarly and performs all the functions that have been described with reference to the clamp shown in Fig. 1 and in approximately identically the same manner, the only difference between the form of clamp shown in Fig. 1 and the form of clamp shown in Fig. 3 being that the clamp in the latter case is provided with an extended arm to receive a pivoting member, and the clamp shown in Fig. 1 is provided with pivoting means arranged at the junction of the arms 15 and 16 thereof.

I claim:

1. A clamp for an electrical conductor comprising a frame provided with two diverging members, one member having an approximately straight seat-forming groove in one face thereof and terminating in a curved portion provided with a lip at the point where said diverging members unite, the other member of said clamp positioned in line with the end of the curved portion of said seat-forming groove and provided at its free end with pivoting means for uniting it to a supporting insulator, and clamping means arranged along said groove for gripping said conductor.

2. A clamp for an electrical conductor comprising a plate provided in one face thereof with an approximately straight seat-forming groove terminating at one side of said plate in a curved portion, and further provided at a point in line with the outer end of the curved portion of said seat-forming groove and adjacent to the opposite side of said plate with means for connecting said plate to a pivoting means for uniting said plate to a supporting insulator, and clamping means extending transversely through said plate and arranged along said groove for clamping said conductor into the seat formed by said groove.

In testimony whereof I have hereunto set my hand in presence of two subscribing witnesses.

ARTHUR O. AUSTIN.

Witnesses:
 HELEN M. STUCKER,
 C. E. HUMPHREY.